(No Model.)
J. DIVORA.
HARROW.
No. 304,624. Patented Sept. 2, 1884.
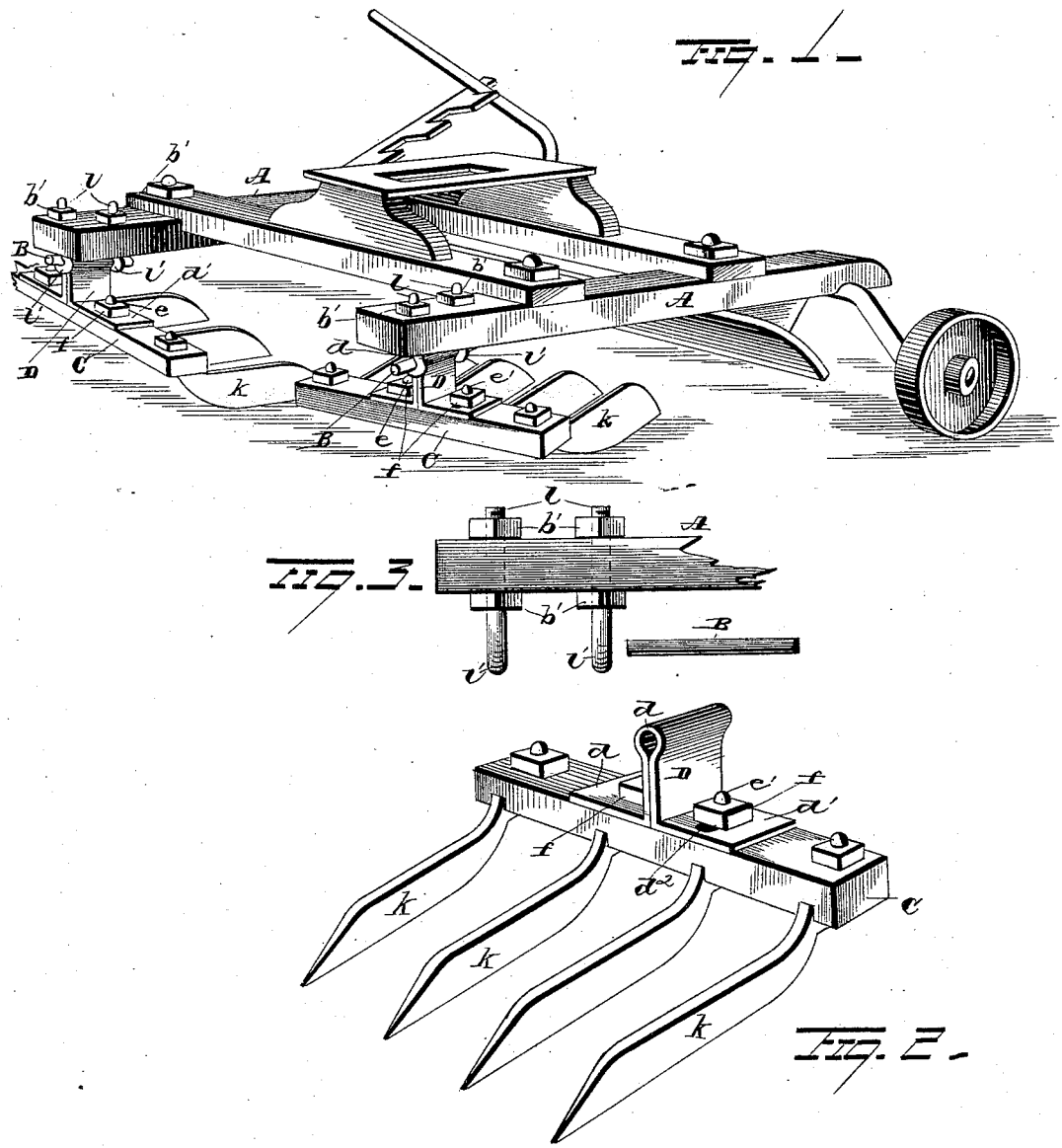
WITNESSES
George F. Downing
S. G. Nottingham
INVENTOR
J. Divora
By H. A. Seymour,
Attorney

UNITED STATES PATENT OFFICE.

JOSEPH DIVORA, OF PERU, ILLINOIS.

HARROW.

SPECIFICATION forming part of Letters Patent No. 304,624, dated September 2, 1884.

Application filed December 6, 1883. (No model.)

*To all whom it may concern:*

Be it known that I, JOSEPH DIVORA, of Peru, in the county of La Salle and State of Illinois, have invented certain new and useful Improvements in Harrows; and I do hereby declare the following to be a full, clear, and exact description of the invention, such as will enable others skilled in the art to which it appertains to make and use the same.

My invention relates to an improvement in harrows, the object being to provide devices for attaching the knife-beam to the harrow-frame, which shall allow the knife-beam a transversely rocking motion and furnish means whereby the said knife-beam may be both horizontally and vertically adjusted.

My present invention relates more particularly to an improvement on the harrow invented by me a short time since, and for which I received Letters Patent No. 263,690, dated September 5, 1882. From the construction there illustrated and fully described, it will be seen that the knife-beams were adjusted horizontally by means of a hook and staples, and that no provision was made for vertical adjustment. My object now is to provide a horizontal adjustment which will admit of the slightest changes and a vertical adjustment for regulating the depth of cut of the knives.

In the accompanying drawings, Figure 1 is a view in perspective of a portion of the harrow embodying my invention ready for use. Fig. 2 is a view of one of the knife-beams with attachments. Fig. 3 is a side view of a portion of one of the side bars of the frame, showing a part of the fastening device.

The two knife-beams with their knives attached are of the same dimensions, the knives of the two beams being arranged symetrically with respect to the line of draft.

A A represent the side bars of the harrow-frame. These bars are provided near their forward ends with the threaded eyebolts $l\ l$, the eyes $l'$ of which form bearings for the ends of the rods or pintles B. These bolts $l$ pass through the ends of the bars A in a line diagonal with the face of the bar, and each is provided with two nuts, $b'$, one under and one above the bar A, which together serve to lock the bolt in any required vertical adjustment. The knife-beams C are pivoted to the rods B by means of the upwardly-projecting metal plates D, terminating at the top in the sleeves $d$, through which the rods B pass, and terminating at the bottom in two horizontal oppositely-extending branches, $d'$, one of which is perforated to receive a bolt, $e$, and the other provided with a transverse curved slot, $d^2$, adapted to receive a bolt, $e'$. These bolts $e$ and $e'$ are threaded and provided with nuts $f$. It will be seen that the beam C can be adjusted horizontally by loosening the nuts $f$ and sliding that end of the beam secured through the slot $d^2$ forward or backward, securing it in any desired position by tightening the nuts $f$. The knives $k$ may be attached to the beams in any approved manner, preferably in the manner described in my patent referred to above. This precise horizontal adjustment of the knife-beams is a very important feature of the harrow, since when the ground is hard or covered with a tough fibrous growth the knives work much better if they are inclined but slightly to the line of draft, while all the intermediate grades of soil from this down to that which is mellow and free will require the intermediate adjustments of the knives to obtain constantly the best results. Again, the vertical adjustment of the knives by means of the bolts $l$, provided with their lock-nuts $b$, become important, as the knives are thereby made to cut deeper as the soil becomes broken and softer.

Having fully described my invention, what I claim as new, and desire to secure by Letters Patent, is—

1. The combination, with the frame, of the knife-beam, plate, or bearing D, pivotally secured on one side to the knife-beam, and provided on its opposite side with an elongated slot, a bolt passing through the elongated slot and beam, and a bolt for pivotally securing the knife-beam to the frame, substantially as set forth.

2. In a harrow, the combination, with the frame, of bolts provided with adjusting-nuts, and with bearings at their lower ends, a pintle mounted in these bearings, an adjusting-plate loosely sleeved on the pintle, and provided with a slot in one of its branches and perforation in the other, and bolts adapted to be received in the slot and perforation, whereby the knife-beam is adjustably secured to the plate, substantially as set forth.

In testimony whereof I have signed this specification in the presence of two subscribing witnesses.

JOSEPH DIVORA.

Witnesses:
SEBASTIAN DIVORA,
JOHN C. WALKER.